United States Patent
Zhang et al.

(10) Patent No.: US 11,671,949 B2
(45) Date of Patent: *Jun. 6, 2023

(54) TIME DOMAIN RESOURCE ALLOCATION FOR PUSCH TRANSMISSION

(71) Applicant: TELEFONAKTIEBOLAGET LM ERICSSON (PUBL), Stockholm (SE)

(72) Inventors: Jianwei Zhang, Solna (SE); Jingya Li, Gothenburg (SE); Zhipeng Lin, Nanjing (CN); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

This patent is subject to a terminal disclaimer.

(21) Appl. No.: 17/169,142

(22) Filed: Feb. 5, 2021

(65) Prior Publication Data

US 2021/0160866 A1    May 27, 2021

Related U.S. Application Data

(63) Continuation of application No. 16/290,772, filed on Mar. 1, 2019, now Pat. No. 10,959,224.

(30) Foreign Application Priority Data

Mar. 2, 2018   (WO) ................ PCT/CN2018/077942

(51) Int. Cl.
*H04W 72/0446* (2023.01)
*H04W 74/08* (2009.01)
*H04W 74/00* (2009.01)

(52) U.S. Cl.
CPC ..... *H04W 72/0446* (2013.01); *H04W 74/004* (2013.01); *H04W 74/0833* (2013.01)

(58) Field of Classification Search
CPC .... G06F 16/93; G06Q 10/02; G06Q 20/0457; G06Q 20/32; G06Q 20/3274; G06Q 20/36;
(Continued)

(56) References Cited

U.S. PATENT DOCUMENTS

| 2016/0135170 A1 | 5/2016 | Chen et al. |
| 2017/0201974 A1* | 7/2017 | Sohn ............... H04W 72/048 |

(Continued)

FOREIGN PATENT DOCUMENTS

| CN | 107667565 A | 2/2018 |
| JP | 2016528791 A | 9/2016 |
| WO | 2015005701 A1 | 1/2015 |

OTHER PUBLICATIONS

Ericsson, "DL/UL resources allocation", 3GPP TSG RAN WG1 Meeting RAN1#92, R1-1803231, Feb. 21, 2018.
(Continued)

*Primary Examiner* — Zhensheng Zhang

(57) ABSTRACT

The embodiments herein relate to time domain resource allocation for PUSCH transmission. In one embodiment, there proposes a method in a wireless communication device for Random Access (RA), comprising: transmitting a preamble on Physical Random Access Channel (PRACH); receiving a Random Access Response (RAR) message; transmitting, on Physical Uplink Shared Channel (PUSCH), a message for terminal identification (Msg3), wherein the time resource allocation of Msg3 is different than the time resource allocation of other message to be transmitted on the PUSCH (normal PUSCH). The embodiments herein can support flexible time resource allocation configuration for Msg3, and at the same time, the signaling overhead in RAR/DCI for indicating the time resource allocation of PUSCH carrying Msg3 can be reduced.

18 Claims, 4 Drawing Sheets

(58) Field of Classification Search
CPC ....... G06Q 20/367; H04L 67/06; H04L 67/34; H04W 72/0446; H04W 74/004; H04W 74/0833
See application file for complete search history.

(56) References Cited

U.S. PATENT DOCUMENTS

2017/0290008 A1* 10/2017 Tooher .............. H04W 72/0446
2017/0366377 A1   12/2017 Papasakellariou
2018/0288746 A1   10/2018 Zhang
2018/0324850 A1* 11/2018 Amuru ................. H04B 7/088

OTHER PUBLICATIONS

Ericsson, "Summary of 7.1.3.3.1 (Resource allocation)", 3GPP TSG RAN WG1 Meeting RAN1#92, R1-1803233, Feb. 26, 2018.
Huawei et al. "Remanining issues on resource allocation and TBS", 3GPP TSG RAN WG1 Meeting RAN1#92, R1-1801343, Feb. 26, 2018.
Nokia et al., "Remaining details on RACH procedure", 3GPP TSG RAN WG1 Meeting RAN1#92, R1-1802022, Feb. 16, 2018.
Ericsson, R1-1805634, "Summary of MSG3 timing discussion", 3GPP TSG RAN WG1 Meeting #92bis, R1-1805634, Sanya, China, Apr. 16-20, 2018.
Interl Corporation, R1-1802414, "Remaining details on DL/UL resource allocation", 3GPP TSG RAN WG1 Meeting #92, R1-1802414, Athens, Greece, Feb. 26-Mar. 2, 2018.

* cited by examiner

TIME DOMAIN RESOURCE ALLOCATION FOR PUSCH TRANSMISSION

RELATED APPLICATIONS

This application is a continuation of U.S. patent application Ser. No. 16/290,772, filed Mar. 1, 2019, which claims priority to and the benefit of International Application No. PCT/CN2018/077942, filed Mar. 2, 2018 and entitled "TIME DOMAIN RESOURCE ALLOCATION FOR PUSCH TRANSMISSION."

TECHNICAL FIELD

The embodiments herein relate generally to the field of wireless communication, and more particularly, the embodiments herein relate to time domain resource allocation for PUSCH transmission.

BACKGROUND

Random Access Procedure

A random access (RA) procedure is a key function in a cellular system. In Long term Evolution (LTE), a UE that would like to access the network initiates the random access procedure by transmitting a preamble (Msg1) in the uplink on the Physical Random Access Channel (PRACH). A gNB (next generation Node B, or TRP, Transmission and Reception Point, i.e. a base station, access node) receiving the preamble and detecting the random-access attempt will respond in the downlink by transmitting a random access response (RAR, Msg2). The RAR carries an uplink scheduling grant for the UE to continue the procedure by transmitting a following subsequent message in the uplink (Msg3) for terminal identification. A similar procedure is envisioned for NR (New Radio, for example, 5G, or beyond); see an illustration in FIG. 1. FIG. 1 is a schematic signaling chart showing the messages in the random access procedure.

Before transmission of the PRACH preamble, the UE receives both a set of synchronization signals and configuration parameters on a broadcast channel in an SS-block (e.g., NR-PSS, NR-SSS, NR-PBCH), possibly complemented with configuration parameters received on yet another channel.

Msg3 Transmission

Msg3 is transmitted by using a PUSCH channel. Besides Msg3 payload, Demodulation Reference Signal (DMRS) is also transmitted to assist the data decoding at the eNB/gNB. In both LTE and NR, for 4-step random access procedure, the initial transmission of Msg3 is scheduled by the UL grant contained in RAR. The retransmission of Msg3 is scheduled by UL grant over PDCCH. In LTE, Msg3 repetition can be configured by the UL grant contained in RAR for coverage enhancements for BL/CE UEs.

UL Grant in RAR in LTE and NR

In LTE, The Uplink Grant field in RAR, also referred to as random access response grant field, indicates the resources to be used on the uplink. The size of the UL Grant field is 20 bits for Non-BL/CE UEs. The content of these 20 bits starting with the MSB and ending with the LSB are as follows:

Hopping flag—1 bit
Fixed size resource block assignment—10 bits
Truncated modulation and coding scheme—4 bits
If a UE is configured with a higher layer parameter pusch-EnhancementsConfig, then
Repetition number of Msg3—3 bits else
TPC command for scheduled PUSCH—3 bits
UL delay—1 bit
CSI request—1 bit.

For NB-IoT UEs, the size of UL grant field is 15 bits, and for BL UEs and UEs in enhanced coverage level 2 or 3, the size of the UL grant field is 12 bits. The contents of the UL grant are listed in Table 6-2 TS 36.213 for BL/CE UE. The detailed design of UL grant in RAR for NR is under discussion.

Resource Allocation for Msg3 in LTE

The frequency resource assignment is indicated by the fixed size resource block assignment field in the UL grant contained in RAR. The Msg3 transmission timing for a non-BL/CE UE (without repetition) is defined as follows:

If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe $n+k_1$, $k_1 \geq 6$, if the UL delay field in RAR is set to zero where $n+k_1$ is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after $n+k_1$ if the field is set to 1.

For BL/CE UE configured with a number of Msg3 PUSCH repetitions, A, the UE shall postpone the PUSCH transmission to the next available UL subframe after n++A if the UL delay field is set to 1.

Time Domain Allocation of PDSCH/PUSCH in NR

Currently time domain allocation of PDSCH (PUSCH) in NR has not been finalized in RAN1 yet, some agreements were met in RAN1 #90bis meeting.

For RRC connected mode, a time resource allocation table with 16 rows is signaled by RRC signaling to a UE per bandwidth part. Then, an index in the scheduling DCI will indicate the exact time resource allocation for PDSCH.

Agreements from RAN1 #90bis:
For both slot and mini-slot, the scheduling DCI can provide an index into a UE-specific table giving the OFDM symbols used for the PDSCH (or PUSCH) transmission:
i. starting OFDM symbol and length in OFDM symbols of the allocation
ii. FFS: one or more tables
iii. FFS: including the slots used in case of multi-slot/multi-mini-slot scheduling or slot index for cross-slot scheduling
iv. FFS: May need to revisit if SFI support non-contiguous allocations
At least for Remaining Minimum System Information (RMSI) scheduling
i. At least one table entry needs to be fixed in the spec.

Subcarrier Spacing (SCS) of Msg3 in NR

NR supports RACH configuration in (RMSI) containing 1 bit to convey SCS of Msg3. In sub-6 GHz, subcarrier spacing of Msg3 can be either 15 or 30 kHz. In over-6 GHz, subcarrier spacing of Msg3 can be either 60 or 120 kHz.

SUMMARY

Timing for Msg3 Transmission and Normal PUSCH in NR

In section 8.3 of TS 38.213 a minimum time between the last symbol on PDSCH contains RAR and the first symbol UE of a corresponding Msg3 PUSCH transmission is defined as N_t1+N_t2+N_ta_max+0.5 ms. N_t1 and N_t2 is the UE processing time that defined in a table in TS 38.214. For numerology 1, N_t1+N_t2 gives about 22 to 25 symbols, N_ta_max is the maximum timing adjustment value that can be provided by TA command in RAR, which is approximately 2 slots. For normal PUSCH transmission, it requires only N_t2 that is 12 symbols.

The timing for Msg3 differs from normal PUSCH transmissions. For initial MSG3 transmission gNB should take into account the necessary UE processing time that is 0.5 ms to handle the MAC packet for all numerologies, the N1 and N2, and the timing advance with range of 0 to 2 slots. It will be difficult to cover K2 in a single table for both normal PUSCH and Msg3 supporting all numerologies with 16 rows.

For NR random access, a new signaling is needed for indicating the time resource assignment for Msg3 transmission/retransmission/repetition, including the starting position and/or the transmission duration, and/or the DMRS configuration associated to the Msg3 transmission/repetition.

In the embodiments, a default time resource allocation table is predefined for normal PUSCH to indicate the timing K2, the starting symbol, and PUSCH length. The timing for PUSCH carrying Msg3 is indicated by using a different between K2 for normal PUSCH and PUSCH carrying Msg3.

In one embodiment, there proposes a method in a wireless communication device for Random Access (RA), comprising: transmitting a preamble on Physical Random Access Channel (PRACH); receiving a Random Access Response (RAR) message; transmitting, on Physical Uplink Shared Channel (PUSCH), a message for terminal identification, wherein the time resource allocation of the message for terminal identification is different than the time resource allocation of other message to be transmitted on the PUSCH.

In another embodiment, there proposes a method in a network node for Random Access (RA), comprising: receiving a preamble on Physical Random Access Channel (PRACH); transmitting a Random Access Response (RAR) message; receiving, on Physical Uplink Shared Channel (PUSCH), a message for terminal identification, wherein the time resource allocation of the message for terminal identification is different than the time resource allocation of other message to be transmitted on the PUSCH.

In yet another embodiment, there proposes a wireless communication device, comprising: at least one processor; and a non-transitory computer readable medium coupled to the at least one processor, the non-transitory computer readable medium contains instructions executable by the at least one processor, whereby the at least one processor is configured to: transmit a preamble on Physical Random Access Channel (PRACH); receive a Random Access Response (RAR) message; transmit, on Physical Uplink Shared Channel (PUSCH), a message for terminal identification, wherein the time resource allocation of the message for terminal identification is different than the time resource allocation of other message to be transmitted on the PUSCH.

In yet another embodiment, there proposes a network node, comprising: at least one processor; and a non-transitory computer readable medium coupled to the at least one processor, the non-transitory computer readable medium contains instructions executable by the at least one processor, whereby the at least one processor is configured to: receive a preamble on Physical Random Access Channel (PRACH); transmit a Random Access Response (RAR) message; receive, on Physical Uplink Shared Channel (PUSCH), a message for terminal identification, wherein the time resource allocation of the message for terminal identification is different than the time resource allocation of other message to be transmitted on the PUSCH.

In yet another embodiment, there proposes a computer readable medium comprising computer readable code, which when run on an apparatus, causes the apparatus to perform any of the above method.

The method herein can support flexible time resource allocation configuration for Msg3, and at the same time, the signaling overhead in RAR/DCI for indicating the time resource allocation of PUSCH carrying Msg3 can be reduced.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C". Furthermore, the singular wording "a", "an", and/or "the" element also intends to cover a plurality of such elements, and thus may means "one or more".

In the embodiments herein, a default time resource allocation table is predefined for normal PUSCH to indicate the timing K2, the starting symbol, and PUSCH length. The timing for PUSCH carrying Msg3 is indicated by using a different between K2 for normal PUSCH and PUSCH carrying Msg3.

Figure 1:
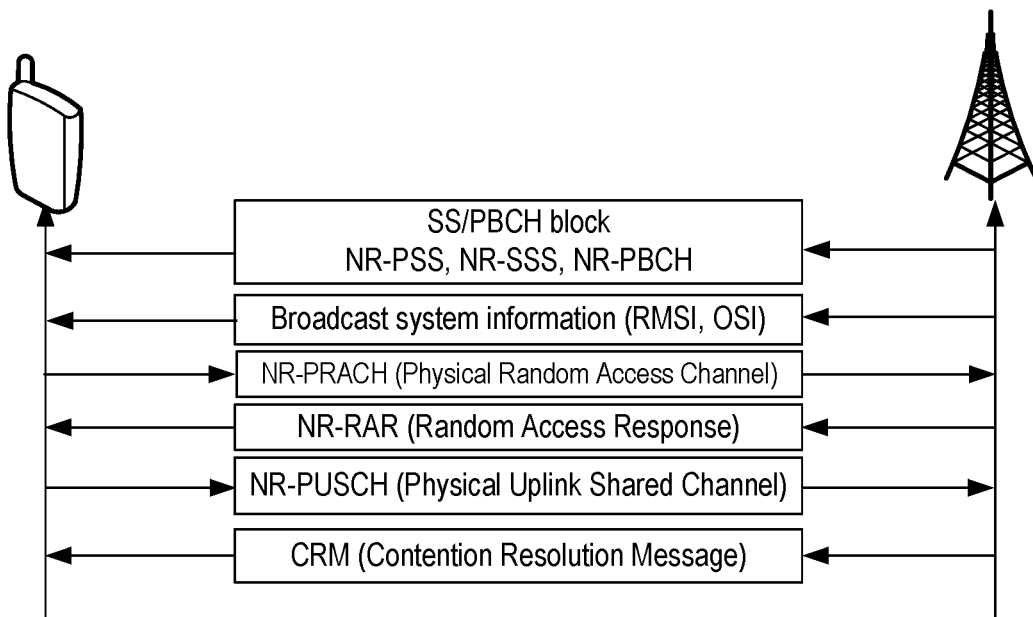
FIG. 1 is a schematic signaling chart showing the messages in the random access procedure.
Figure 2:
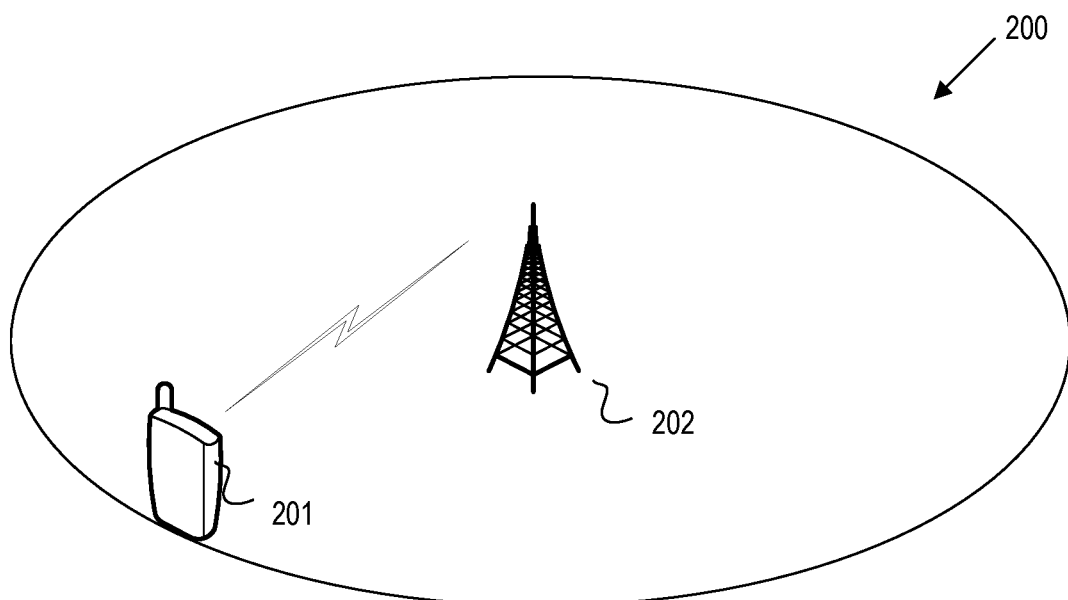
FIG. 2 is a schematic block diagram showing an example wireless communication system, in which the embodiments herein can be implemented.

FIG. 2 shows a schematic diagram of an example wireless communication system 200, in which the embodiments can be implemented. In one embodiment, the wireless communication system 200 may include at least one wireless communication device 201 and at least one network node 202. However, the embodiments herein do not limit the number of the wireless communication device 201 and the network node 202.

In one embodiment, the wireless communication system 200 may be embodied as for example UE, device to device (D2D) UE, proximity capable UE (i.e., ProSe UE), machine type UE or UE capable of machine to machine (M2M) communication, Personal Digital Assistant (PDA), PAD, Tablet, mobile terminals, smart phone, laptop embedded equipped (LEE), laptop mounted equipment (LME), USB dongles, etc.

In one embodiment, the network node 202 may be embodied as for example eNodeB (eNB), Base Station (BS), network controller, radio network controller (RNC), base station controller (BSC), relay, donor node controlling relay, base transceiver station (BTS), access point (AP), transmission points, transmission nodes, etc. In one embodiment, the network node 202 may be a gNB (next generation Node B). In one embodiment, the wireless communication system 200 may be configured in an Over The Top (OTT) scenario.

The time resource assignment configuration for Msg3 transmission in NR should consider the minimum gap between RAR and Msg3 specified in NR and the semi-static TDD configuration indicated by higher layer parameters, e.g., in RMSI or Radio Resource Control (RRC). The time resource configuration for Msg3 transmission/retransmission/repetition should also be a function of at least the transmission duration, and/or, DMRS configuration, and/or starting position.

In one embodiment, at least one default time resource allocation table (Table A) is predefined for PUSCH other than Msg3 (referred to as normal PUSCH). A default table (Table B) is predefined for Msg3 to indicate the difference of K2 values between PUSCH carrying Msg3 and normal PUSCH (referred to as K2 offset).

In one embodiment, the K2 offset table (Table B) is formed by a one-to-one mapping between the K2 offset value and the numerology. For example, the table B1 below:

TABLE B1

| | Numerology (subcarrier spacing) | | | |
|---|---|---|---|---|
| | 0 (15 KHz) | 1 (30 KHz) | 2 (60 KHz) | 3 (120 KHz) |
| K2 offset (in slot) | 2 | 2 | 4 | 5 |

In another embodiment, the K2 offset table (Table B) supports multiple K2 offset values per numerology or for some numerologies. The K2 offset value used for PUSCH carrying Msg3 is indicated by some reserved or unused bits in RAR. For example, the time resource allocation field in UL grant in RAR has 4 bits, where 3 bits are used for indicating the row index of Table A, 1 bit is used to signal the K2 offset to choose from Table B. For example, the table B2 below:

TABLE B2

| | Numerology (subcarrier spacing) | | | |
|---|---|---|---|---|
| | 0 (15 KHz) | 1 (30 KHz) | 2 (60 KHz) | 3 (120 KHz) |
| K2 offset (in slot) | {1, 2} | 2 | {3, 4} | 5 |

The time resource allocation for PUSCH carrying Msg3 is indicated by using the default K2 offset table (Table B) together with the default time resource allocation table for normal PUSCH (Table A).

The starting position and symbol length for PUSCH carrying Msg3 is indicated by the time domain resource allocation field in the UL grant in RAR. The time domain resource allocation field in RAR indicates the row index of Table A, that is used for the UE to read the information of K2 for normal PUSCH, starting symbol position and length of PUSCH carrying Msg3. The K2 value for PUSCH carrying Msg3 is obtained by the K2 for normal PUSCH+K2 offset.

In one embodiment, a single default time allocation table (Table C) is used for both normal PUSCH and PUSCH carrying Msg3. This Table C can be formed by combing Table A and Table B per numerology.

By the embodiments herein, a default time resource allocation table is predefined for normal PUSCH to indicate the timing K2, the starting symbol, and PUSCH length. The timing for PUSCH carrying Msg3 is indicated by using a different between K2 for normal PUSCH and PUSCH carrying Msg3.

Figure 3:
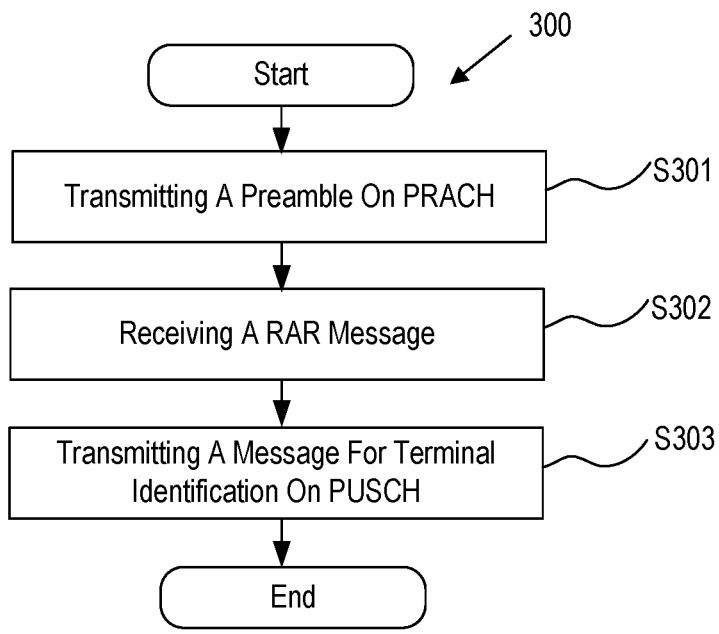
FIG. 3 is a schematic flow chart showing an example method in a wireless communication device, according to the embodiments herein.

FIG. 3 is a schematic flow chart showing an example method 300 in a wireless communication device, according to the embodiments herein. In one embodiment, the flow chart in FIG. 3 can be implemented in the wireless communication device 201 in FIG. 2.

The method 300 may begin with step S301, in which the wireless communication device 201 may transmit a preamble on Physical Random Access Channel (PRACH) (Msg1). Then, the method 300 may proceed to step S302, in which the wireless communication device 201 may receiving a RAR message (Msg2) sent by the network node 202 in response to the preamble. Then, the method 300 may proceed to step S303, in which the wireless communication device 201 may transmit, on Physical Uplink Shared Channel (PUSCH), a message for terminal identification (Msg3). Then, although not shown, the wireless communication device 201 may further receive a Contention Resolution Message (CRM) (Msg4) from the network node 202. In one embodiment herein, the time resource allocation(s) of Msg3 is different than the time resource allocation of any other message(s) to be transmitted on the PUSCH (may be referred as normal PUSCH herein).

In one embodiment, the time resource allocation(s) of the Msg3 has a timing offset (which may be referred as K2 offset) from the time resource allocation of the other message to be transmitted on the PUSCH. In one embodiment, the time resource allocation(s) of the Msg3 may be used to specify a minimum time between the last symbol on PDSCH contains RAR and the first symbol UE of a corresponding Msg3 PUSCH transmission. Note that, there may be only one time resource allocation or a plurality of time resource allocations.

In one embodiment, the time resource allocation of the normal PUSCH may depend on the numerology used. For example, the time resource allocation of the normal PUSCH may depend on the subcarrier spacing (SCS) used, or the other parameter.

In one embodiment, the time resource allocation of the normal PUSCH is indicated by the network node 202 via Remaining Minimum System Information (RMSI), RRC, and/or Downlink Control Information (DCI). In one embodiment, the time resource allocation of the normal PUSCH is indicated by the network node 202 via any other message(s).

In one embodiment, the time resource allocation of the normal PUSCH may be placed and/or transmitted in a first predefined table or a first configured table (may be referred as table A). In one embodiment, more than one table A is defined.

In one embodiment, the timing offset (i.e., K2 offset) may also depend on the numerology used. In one approach, there may be a one-to-one mapping between the K2 offset value and the numerology. In another approach, for one numerology, there may be more than one possible K2 offset. As used herein, the numerology may include the subcarrier spacing (SCS) used, or the other parameter.

In one embodiment, the timing offset (K2 offset) may be also indicated by a network node via RMSI, RRC, DCI, and/or any other messages. In one embodiment, the timing offset (K2 offset) may be also indicated by the network node 202 in the RAR message (Msg2). In one embodiment, there is no necessary for the network node 202 to indicate the timing offset (K2 offset), since the wireless communication device 201 (for example UE) has known the K2 offset to be used for Msg3 in advance.

In one embodiment, the K2 offset may be placed and/or transmitted in a second predefined table or a second configured table (may be referred as table B). For example, for one-to-one mapping between the K2 offset value and the numerology, the table B may be embodied as the above mentioned table B 1. Furthermore, as another example, the table B may be embodied as the above mentioned table B2, in which there may be more than one alternative K2 offset value for one numerology.

In one embodiment, the table A and the table B may be merged into a single default time allocation table (Table C), which is used for both normal PUSCH and PUSCH carrying Msg3. This Table C can be formed by combing Table A and Table B per numerology.

The above steps are only examples, and the wireless communication device 201 can perform any actions described in connection to FIG. 2.

Figure 4:
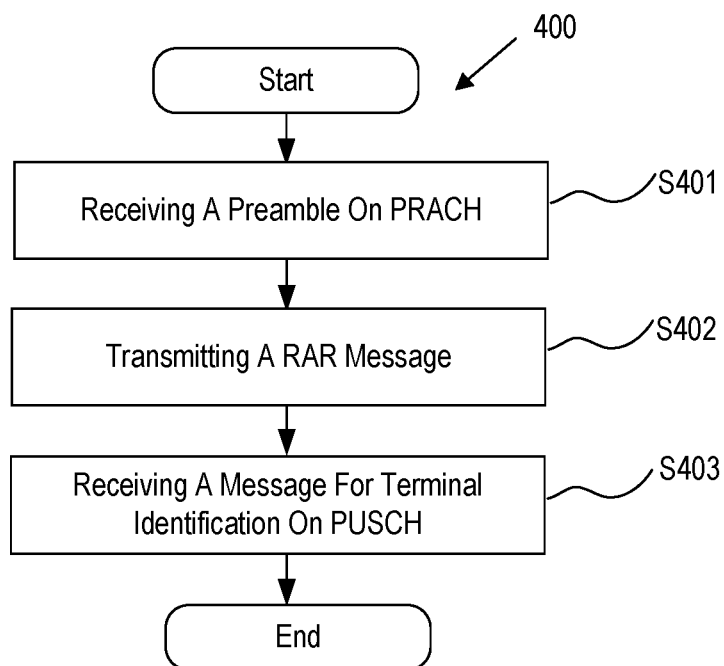
FIG. 4 is a schematic flow chart showing an example method in a network node, according to the embodiments herein.

FIG. 4 is a schematic flow chart showing an example method 400 in the network node, according to the embodiments herein. In one embodiment, the flow chart in FIG. 4 can be implemented in the network node 202 in FIG. 2.

The method 400 may begin with step S401, in which the network node 202 may receive a preamble on Physical Random Access Channel (PRACH) (Msg1), and the preamble may indicate a wireless communication device (UE) attempting to access to the network node 202. Of course, there may be more than one UE attempting to access to the network node 202. Then, the method 400 may proceed to step S402, in which the network node 202 may transmit a RAR message (Msg2) to the UE(s) attempting to access to the network node 202, in response to the preamble. The Msg2 may include Uplink (UL) grant for one or more UE. Then, the method 400 may proceed to step S403, in which the network node 202 may receive, on Physical Uplink Shared Channel (PUSCH), a message for terminal identification (Msg3), from the one or more UE. Then, although not shown, the network node 202 may further transmit a Contention Resolution Message (CRM) (Msg4) to the one or more UE. In one embodiment herein, the time resource allocation(s) of Msg3 is different than the time resource allocation of any other message(s) to be transmitted on the PUSCH (may be referred as normal PUSCH herein).

In one embodiment, the time resource allocation(s) of the Msg3 has a timing offset (which may be referred as K2 offset) from the time resource allocation of the other message to be transmitted on the PUSCH. In one embodiment, the time resource allocation(s) of the Msg3 may be used to specify a minimum time between the last symbol on PDSCH contains RAR and the first symbol UE of a corresponding Msg3 PUSCH transmission. Note that, there may be only one time resource allocation or a plurality of time resource allocations.

In one embodiment, the time resource allocation of the normal PUSCH may depend on the numerology used. For example, the time resource allocation of the normal PUSCH may depend on the subcarrier spacing (SCS) used, or the other parameter.

In one embodiment, the network node 202 may indicate the time resource allocation of the normal PUSCH via RMSI, RRC, and/or DCI. In one embodiment, the network node 202 may indicate the time resource allocation of the normal PUSCH via any other message(s).

In one embodiment, the time resource allocation of the normal PUSCH may be placed and/or transmitted in a first predefined table or a first configured table (may be referred as table A). In one embodiment, more than one table A is defined.

In one embodiment, the timing offset (i.e., K2 offset) may also depend on the numerology used. In one approach, there may be a one-to-one mapping between the K2 offset value and the numerology. In another approach, for one numerology, there may be more than one possible K2 offset. As used herein, the numerology may include the subcarrier spacing (SCS) used, or the other parameter.

In one embodiment, the network node 202 may also indicate the timing offset (K2 offset) via RMSI, RRC, DCI, and/or any other messages. In one embodiment, the network node 202 may indicate the timing offset (K2 offset) in the RAR message (Msg2). In one embodiment, there is no necessary for the network node 202 to indicate the timing offset (K2 offset), since the wireless communication device 201 (for example UE) has known the K2 offset to be used for Msg3 in advance.

In one embodiment, the K2 offset may be placed and/or transmitted in a second predefined table or a second configured table (may be referred as table B). For example, for one-to-one mapping between the K2 offset value and the numerology, the table B may be embodied as the above mentioned table B 1. Furthermore, as another example, the table B may be embodied as the above mentioned table B2, in which there may be more than one alternative K2 offset value for one numerology.

In one embodiment, the table A and the table B may be merged into a single default time allocation table (Table C), which is used for both normal PUSCH and PUSCH carrying Msg3. This Table C can be formed by combing Table A and Table B per numerology.

The above steps are only examples, and the network node 202 can perform any actions described in connection to FIG. 2.

Figure 5:
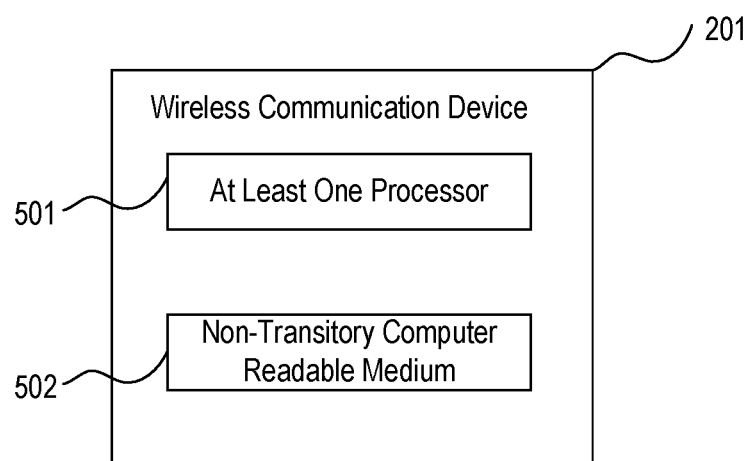
FIG. 5 is a schematic block diagram showing an example wireless communication device, according to the embodiments herein.

FIG. 5 is a schematic block diagram showing an example wireless communication device 201, according to the embodiments herein.

In one embodiment, the wireless communication device 201 may include at least one processor 501; and a non-transitory computer readable medium 502 coupled to the at least one processor 501. The non-transitory computer readable medium 502 contains instructions executable by the at least one processor 501, whereby the at least one processor 501 is configured to perform the steps in the example method 300 as shown in the schematic flow chart of FIG. 3; the details thereof is omitted here.

Note that, the wireless communication device 201 can be embodied in hardware, software, firmware, and/or any combination thereof. For example, the wireless communication device 201 may include a plurality of units, circuities, or modules, each of which can be used to perform a step of the example method 300 or any step shown in FIG. 2 related to the wireless communication device 201.

Figure 6:
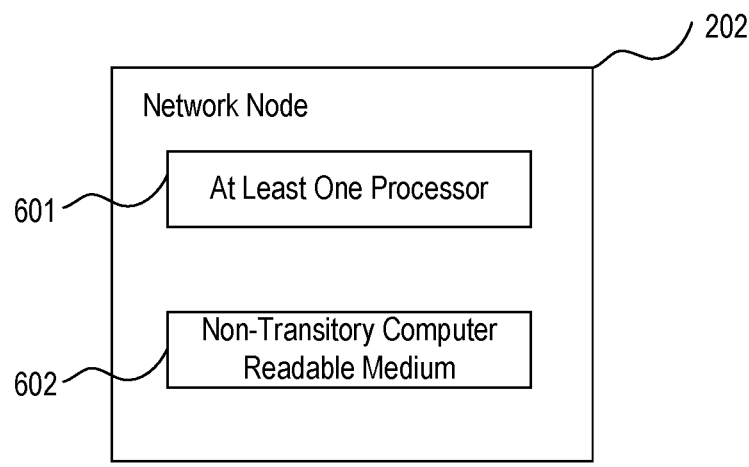
FIG. 6 is a schematic block diagram showing an example network node, according to the embodiments herein.

FIG. 6 is a schematic block diagram showing an example network node 202, according to the embodiments herein.

In one embodiment, the network node 202 may include at least one processor 601; and a non-transitory computer readable medium 602 coupled to the at least one processor 601. The non-transitory computer readable medium 602 contains instructions executable by the at least one processor 601, whereby the at least one processor 601 is configured to perform the steps in the example method 400 as shown in the schematic flow chart of FIG. 4; the details thereof is omitted here.

Note that, the network node 202 can be embodied in hardware, software, firmware, and/or any combination thereof. For example, the network node 202 may include a plurality of units, circuities, or modules, each of which can be used to perform a step of the example method 400 or any step shown in FIG. 2 related to the network node 202.

Figure 7:
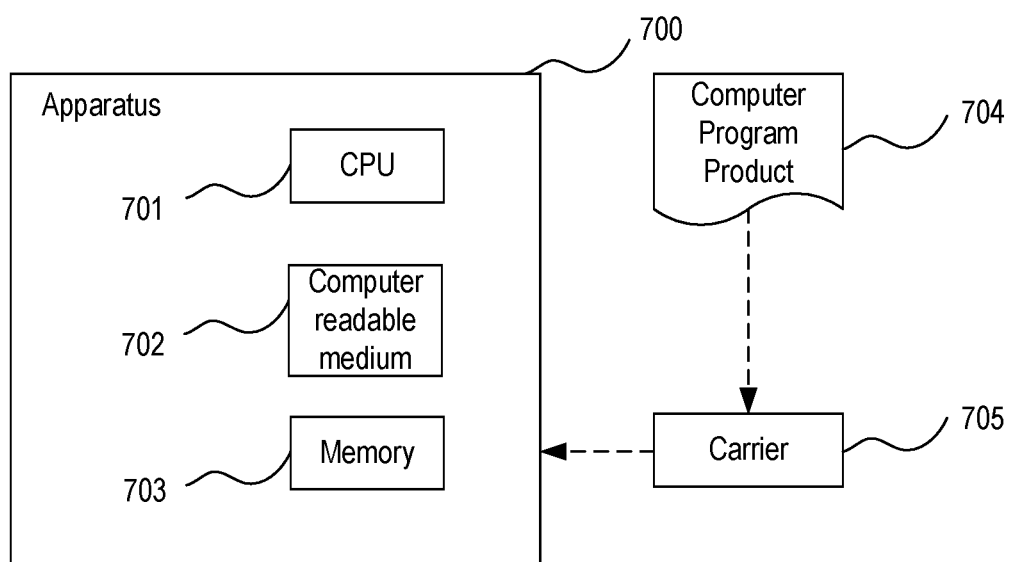
FIG. 7 is a schematic block diagram showing an apparatus, according to the embodiments herein.

FIG. 7 is a schematic block diagram showing an apparatus 700, according to the embodiments herein. In one embodiment, the apparatus 700 can be configured as any of the above mentioned apparatuses, such as the wireless communication device 201 or the network node 202.

In one embodiment, the apparatus 700 may include but not limited to at least one processor such as Central Processing Unit (CPU) 701, a computer-readable medium 702, and a memory 703. The memory 703 may comprise a volatile (e.g. Random Access Memory, RAM) and/or non-volatile memory (e.g. a hard disk or flash memory). In one embodiment, the computer-readable medium 702 may be configured to store a computer program and/or instructions, which, when executed by the processor 701, causes the processor 701 to carry out any of the above mentioned methods.

In one embodiment, the computer-readable medium 702 (such as non-transitory computer readable medium) may be stored in the memory 703. In another embodiment, the computer program can be stored in a remote location for example computer program product 704 (also can be embodied as computer-readable medium), and accessible by the processor 701 via for example carrier 705.

The computer-readable medium 702 and/or the computer program product 704 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP Third Generation Partnership Project
CRM Contention Resolution Message
DCI Downlink Control Information
DMRS Demodulation Reference Signal
LTE Long-Term Evolution
NR New Radio
OFDM Orthogonal Frequency Division Multiplexing
OTT Over The Top
PBCH Physical Broadcast Channel
PDCCH Physical Downlink Control Channel PDSCH Physical Downlink Shared Channel
PRACH Physical Random Access Channel
PSS Primary Synchronization signal
PUSCH Physical Uplink Shared Channel
RA Random Access
RAN Radio Access Network
RAR Random Access Response
RMSI Remaining Minimum System Information
RRC Radio Resource Control
SCS Subcarrier Spacing
SSS Secondary Synchronization signal
TDD Time Division Duplexing
UL Uplink.

What is claimed is:

1. A method of operating a wireless communication device, the method comprising:
    transmitting a preamble on a Physical Random Access Channel (PRACH);
    receiving a Random Access Response (RAR) message containing an uplink (UL) grant;
    transmitting, on a Physical Uplink Shared Channel (PUSCH), a first message wherein the first message is scheduled by the RAR message and has a first time resource allocation; and
    transmitting, on the PUSCH, a second message wherein the second message is not scheduled by the RAR message and has a second time resource allocation, the first and second time resource allocations being different by a predetermined timing offset that is based on a numerology.

2. The method of claim 1, wherein the first message is an Msg3 message and the second message is a non-Msg3 message.

3. The method of claim 1, wherein the predetermined timing offset corresponds to a numerology according to:

| numerology | 0 | 2 |
|---|---|---|
| offset in unit of slot | 2 | 4. |

4. The method of claim 1, wherein the predetermined timing offset applies to the first time resource allocation.

5. The method of claim 1, wherein the predetermined timing offset applies to the second time resource allocation.

6. The method of claim 1, wherein the predetermined timing offset depends on a numerology used, and there is one timing offset for one numerology.

7. The method of claim 1, wherein the predetermined timing offset depends on a numerology used, and there is more than one timing offset for one numerology.

8. The method of claim 1, wherein the predetermined timing offset is indicated in the RAR message.

9. A wireless communication device comprising:
    a processor; and
    a non-transitory computer readable medium in communication with the processor, the non-transitory computer readable medium storing instructions executable by the processor, whereby the processor is configured to perform operations comprising:
    transmitting a preamble on a Physical Random Access Channel (PRACH);
    receiving a Random Access Response (RAR) message containing an uplink (UL) grant;
    transmitting, on a Physical Uplink Shared Channel (PUSCH), a first message wherein the first message is scheduled by the RAR message and has a first time resource allocation; and
    transmitting, on the PUSCH, a second message wherein the second message is not scheduled by the RAR message and has a second time resource allocation, the first and second time resource allocations being different by a predetermined timing offset that is based on a numerology.

10. The wireless communication device of claim 9, wherein the first message is an Msg3 message and the second message is a non-Msg3 message.

11. The wireless communication device of claim 9, wherein the predetermined timing offset corresponds to a numerology according to:

| numerology | 0 | 2 |
|---|---|---|
| offset in unit of slot | 2 | 4. |

12. The wireless communication device of claim 9, wherein the predetermined timing offset applies to the first time resource allocation.

13. The wireless communication device of claim 9, wherein the predetermined timing offset applies to the second time resource allocation.

14. The wireless communication device of claim 9, wherein the predetermined timing offset depends on a numerology used, and there is one timing offset for one numerology.

15. The wireless communication device of claim 9, wherein the predetermined timing offset depends on a numerology used, and there is more than one timing offset for one numerology.

16. The wireless communication device of claim 9, wherein the predetermined timing offset is indicated in the RAR message.

17. A method of operating a wireless communication device, the method comprising:
    transmitting a preamble on a Physical Random Access Channel (PRACH);
    receiving a Random Access Response (RAR) message containing an uplink (UL) grant;
    transmitting, on a Physical Uplink Shared Channel (PUSCH), a first message wherein the first message is a Msg3 message and has a first time resource allocation; and
    transmitting, on the PUSCH, a second message wherein the second message is a non-Msg3 message and has a second time resource allocation, the first and second time resource allocations being different by a predetermined timing offset that is based on a numerology.

18. The method of claim 17, wherein the predetermined timing offset is a number of slots.

* * * * *

UNITED STATES PATENT AND TRADEMARK OFFICE
CERTIFICATE OF CORRECTION

PATENT NO. : 11,671,949 B2
APPLICATION NO. : 17/169142
DATED : June 6, 2023
INVENTOR(S) : Zhang et al.

It is certified that error appears in the above-identified patent and that said Letters Patent is hereby corrected as shown below:

On the Title Page

On Page 2, in Item (56), under "OTHER PUBLICATIONS", in Column 1, Line 3, delete ""Remanining" and insert -- "Remaining --, therefor.

On Page 2, in Item (56), under "OTHER PUBLICATIONS", in Column 1, Line 11, delete "Interl" and insert -- Intel --, therefor.

In the Specification

In Column 1, Line 7, delete "2019," and insert -- 2019, now Pat. No. 10,959,224, --, therefor.

In Column 1, Line 24, delete "term" and insert -- Term --, therefor.

In Column 1, Line 57, delete "The" and insert -- the --, therefor.

In Column 1, Line 65, delete "bits" and insert -- bits. --, therefor.

In Column 2, Line 30, delete "A," and insert -- $\Delta$, --, therefor.

In Column 2, Line 31, delete "n++A" and insert -- $n+k_1+\Delta$ --, therefor.

In Column 2, Line 35, delete "RANI" and insert -- RAN1 --, therefor.

In Column 2, Line 36, delete "RANI" and insert -- RAN1 --, therefor.

In Column 2, Line 41, delete "RANI" and insert -- RAN1 --, therefor.

In Column 2, Line 53, delete "allocations" and insert -- allocations. --, therefor.

Signed and Sealed this
Fifth Day of December, 2023

Katherine Kelly Vidal
*Director of the United States Patent and Trademark Office*

In Column 3, Line 3, delete "that defined" and insert -- defined --, therefor.

In Column 3, Line 26, delete "different" and insert -- difference --, therefor.

In Column 5, Line 5, delete "different" and insert -- difference --, therefor.

In Column 5, Line 21, delete "equipped" and insert -- equipment --, therefor.

In Column 6, Lines 43-44, delete "receiving" and insert -- receive --, therefor.

In Column 7, Line 28, delete "necessary" and insert -- necessity --, therefor.

In Column 7, Line 37, delete "B 1." and insert -- B1. --, therefor.

In Column 8, Line 44, delete "necessary" and insert -- necessity --, therefor.

In Column 8, Line 53, delete "B 1." and insert -- B1. --, therefor.